United States Patent [19]

Thorson et al.

[11] Patent Number: 5,422,776

[45] Date of Patent: Jun. 6, 1995

[54] IMPROVEMENT IN A MAGNETIC DISK DRIVE FOR BALANCING A DISK PACK ASSEMBLY

[75] Inventors: Laurene J. Thorson, Louisville; Paul M. Clark, Thorton, both of Colo.

[73] Assignee: Maxtor Corporation, San Jose, Calif.

[21] Appl. No.: 174,031

[22] Filed: Dec. 27, 1993

[51] Int. Cl.⁶ .............................................. G11B 17/02
[52] U.S. Cl. ...................................................... 360/98.07
[58] Field of Search ........................... 360/98.01–98.08

[56] References Cited

U.S. PATENT DOCUMENTS

| | | | |
|---|---|---|---|
| 4,642,886 | 2/1987 | Muck et al. | 29/598 |
| 4,739,425 | 4/1988 | Dierkes et al. | 360/97 |
| 4,780,777 | 10/1988 | Biermeier et al. | 360/98 |
| 4,949,579 | 8/1990 | Nayar | 73/468 |

*Primary Examiner*—Robert S. Tupper

[57] ABSTRACT

An apparatus for balancing a disk pack assembly advantageously provides consistent imbalance correction by the use of precision manufactured plugs which are selectively attached to a spin motor at various locations. The weight of individual plugs is carefully and precisely controlled across a wide range of weights. Because the weights of the plug members are controlled to a high tolerance, the invention allows for easy and precise correction of disk pack assembly imbalances.

19 Claims, 1 Drawing Sheet

5,422,776

IMPROVEMENT IN A MAGNETIC DISK DRIVE FOR BALANCING A DISK PACK ASSEMBLY

FIELD OF THE INVENTION

The present invention relates generally to the balance of rotating assemblies. More specifically, the present invention relates to the fields of magnetic recording, disk drives and to methods and apparatus for correcting imbalance in a disk pack assembly.

BACKGROUND OF THE INVENTION

Imbalance in rotating bodies and assemblies has been a pervasive problem ever since the invention of the wheel. This familiar problem is characterized by an imbalance in the weight distribution of a body or assembly as it spins about a rotational axis. Depending upon the speed of rotation and other factors, a weight imbalance can cause an undesirable "wobble" which interferes with the smooth rotation of the spinning body. Today, this problem is widespread across a broad range of technologies ranging from automobile wheel hubs to sophisticated high-speed hard disk drive units.

In a conventional hard disk drive unit, information is recorded on concentric tracks of the surface of a rotating magnetic disk using a transducer element. Ordinarily, the transducer is also used for reading the information back from the surface of the moving disk, which itself is driven by an electromagnetic spin motor. In most cases, the disks are clamped to an annular hub which rotates about a central shaft or axis. The combination of the hub and stacked disks is frequently referred to as the disk pack assembly of the drive.

As is appreciated, the process of writing information to the concentric tracks of the disk is made difficult whenever the disk pack assembly is imbalanced, for whatever reason. By way of example, what happens when an imbalance exists is that the normal circular rotation of the disks becomes exaggerated. Instead of writing a track of data in a full, circular ring-shape, the track is written in an oblong pattern. When perfect circular tracks can no longer be written to the disk's magnetic surface, fewer data tracks can fit in the finite space between the inside and outside diameters of the disk. The net result is that weight imbalance in a disk pack assembly compromises the total number of tracks which can be written to a magnetic disk, and thus, the overall recording density is diminished.

A number of methods and apparatus for combating the problem of disk pack assembly imbalance have been tried in the past. For instance, according to one prior art approach, screws are inserted into any of the available threaded holes disposed along the top surface or end cap of the circular spin motor hub. Ordinarily, such holes are present in the top of the spin motor to accommodate screws used in clamping the disk pack in place. Since not all of the available holes in the top of the spin motor are utilized for clamping the disk pack, different sized screws are threadably inserted into the remaining open holes to try and correct for disk pack weight imbalance. The idea, obviously, is to compensate the disk pack by inserting a screw at the precise location that produces an evenly balanced weight distribution.

Unfortunately, there exists a large degree of variability in the individual weights of each of the screws. The variability in the weights of the screws—even those that are machined to high tolerances—makes it very hard to accurately compensate for weight imbalances using this approach. The inconsistent results produced by this method has lead practitioners to search for a new solution to the problem of disk pack imbalance in disk drive units.

As will be seen, the present invention overcomes the drawbacks of the prior art by providing a precision manufactured plug that can be easily inserted into the holes of the spin motor to precisely correct for imbalances in weight distribution. Since the plugs of the present invention can be manufactured in a diversity of precise weights, highly consistent imbalance correction is achieved.

SUMMARY OF THE INVENTION

An apparatus for balancing a disk pack assembly is described. The present invention advantageously provides consistent imbalance correction by the use of precision manufactured plugs which are selectively attached to a spin motor at various locations. The weight of the individual plugs is carefully and precisely controlled across a wide range of weights. Due to the fact the weights of the plug members are controlled to a high tolerance, the invention allows for easy and precise correction of disk pack assembly imbalances.

In one embodiment, the invention comprises a plurality of plug members adapted for selective insertion into one or more openings disposed about the longitudinal axis of a spin motor. Each of the plug members is physically the same size and includes a cap and a capture member. The capture member allows for insertion of the plug member into one of the openings disposed about the spin motor. The weight of the plug members is carefully controlled by varying the percentage of a predetermined material embedded within the cap. In this way, the physical dimensions of the plug members remains constant, but the weights of the plug members themselves are directly proportional to the percentage of material used in the cap.

Although the present invention is ideally-suited for application in disk drives, the concept of balancing a rotating body utilizing plug members as described herein may find a wide application in a variety of other technologies.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An apparatus to compensate for imbalance in a disk pack assembly is disclosed. In the following description, numerous specific details are set forth such as specific weights, dimensions, methods, etc., in order to provide a thorough understanding of the present invention. It will be obvious, however, to one skilled in the art that these specific details need not be used to practice the present invention. In other instances, well-known structures and mechanics have not been shown in order to avoid unnecessarily obscuring the present invention.

Figure 1:
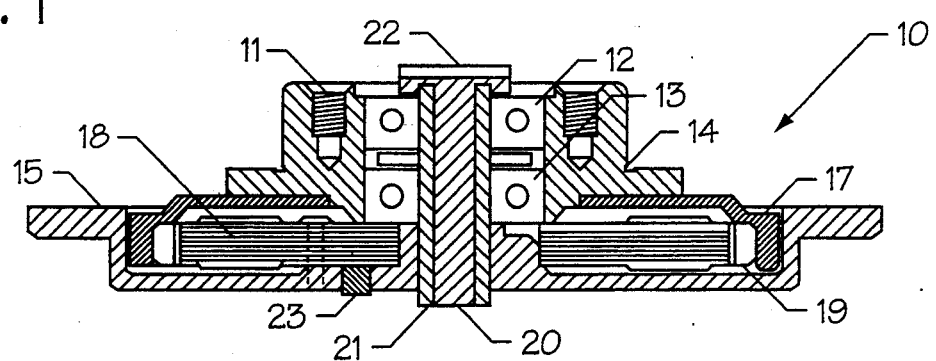
FIG. 1 is a cross-sectional side view of a disk pack assembly including a spin motor for rotating the assembly about a central axis.

With reference to FIG. 1, there is shown a cross-sectional side view of a spin motor assembly 10 for use in a hard disk drive unit. Assembly 10 includes a hub 14 onto which are mounted one or more annular disks. The disks are routinely clamped in place utilizing threaded screws which are secured within holes 11. The magnetic disks mounted to hub 14 comprises the disk pack assembly of the disk drive.

Upper and lower bearings 12 and 13, respectively permit the rotation of hub 14 around a central longitudinal axis, such as central shaft 20 in FIG. 1. The rotary movement of the disk pack results from the interaction between a permanent magnet 19 attached to magnet cup 17 and stationary stator coils 18. When a current is passed through stator coils 18, the electromagnetic interaction between magnet 19 and coils 18 causes hub 14 to rotate about shaft 20. (Note that electrical connection to stator coils 18 is made through orifice 23.)

Figure 2:
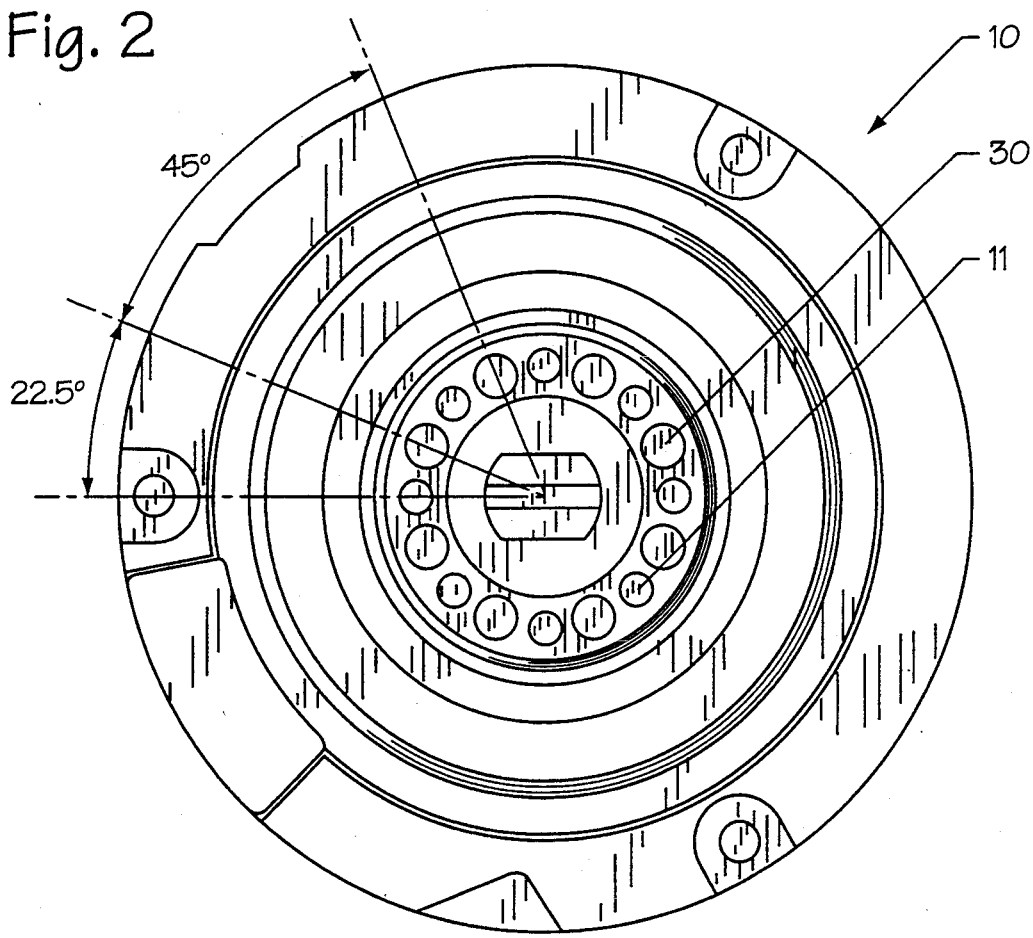
FIG. 2 is a top view of the assembly of FIG. 1 showing the insertion of plug members in accordance with the present invention.

FIG. 2 shows a top view of spin motor assembly 10 further illustrating the location of holes 11 disposed radially about the central longitudinal axis of the spin motor. As can be clearly seen, each of holes 11 are spaced equidistant from each other in a circular pattern disposed a fixed radial distance from the central axis point. By way of example, FIG. 2 shows the holes being spaced approximately 22.5° apart. The physical distance separating holes 11 from each other is not deemed to be a critical aspect of the present invention.

Practitioners in the art will appreciate that not all of the holes 11 need be utilized to secure the disk pack assembly. Normally, only four screws are required to adequately secure the disk pack assembly to the spin motor via holes 11. In this respect, the screws which are used to secure the disk pack to the motor are spaced equidistant around the central axis. In accordance with the present invention, the remaining empty holes 11 are advantageously used to accommodate plugs 30. As will be explained in more detail shortly, plugs 30 are selectively inserted into the remaining holes in order to correct for disk pack assembly imbalance. These holes provide a convenient way of attaching plugs 30 to the spin motor by simple insertion of the capture member of a plug 30 into a hole 11 in a male-female connection.

The exemplary embodiment of FIG. 2 shows that every other hole 11 has inserted therein a plug member 30 to provide for correction of imbalance in the disk pack assembly. The spacing between plugs 30 is illustrated in FIG. 2 as being approximately 45° apart. Although the example of FIG. 2 shows a total of eight plugs inserted into the spin motor for correction of weight imbalance, it should be understood that there is no requirement that all of the available holes 11 be occupied by a plug 30. In some instances, a single, exactly weighted plug inserted into the correct location may be enough to provide proper balance. In other cases, a number of plugs, each having a different weight and disposed radially about the axis of rotation, may be required.

Figure 3A:
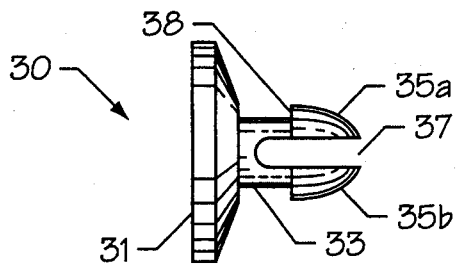
FIG. 3A is a side view of a plug member utilized in accordance with the present invention.
Figure 3B:
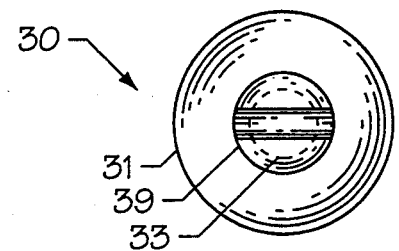
FIG. 3B is a top view of a plug member utilized in accordance with the present invention.

FIGS. 3A and 3B illustrate plug 30 of the present invention. Plug 30 comprises a cap 31, which is generally cylindrical in shape and has a predetermined height or thickness. In the embodiment shown, cap 31 is approximately 0.18 millimeters thick and is integrally attached to a capture member 33. Capture member 33 comprises a cylindrical shaft having a central void 37 which separates wider portions 35a and 35b. The breadth of portions 35a and 35b beyond the diameter of the cylindrical shaft creates a flange 38.

During the imbalance correction process, capture member 33 of plug 30 is inserted into a selected one of holes 11 of the spin motor assembly. Capture member 33 functions to allow plug 30 to be inserted straightway into any one of holes 11 without the need for screwing or threading to hold the plug in place. (Of course, other embodiments may employ a capture member having screw threads or other similar means for securely and snugly engaging holes 11.)

As described above, the primary purpose of capture member 33 is to provide a snap-fit insertion into one of holes 11. During the balancing process, raised portions 35a and 35b engage the sidewalls of the hole to which it is to be inserted. Further insertion of the plug causes portions 35a and 35b to forcibly press against the sidewalls of the hole. At the same time, portions 35a and 35b move together so as to reduce the volume of void 37. In the case where holes 11 are tapped with screw threads, flange 38 eventually engages one of the screw threads to secure the plug in the hole. In this manner, a secure fit into holes 11 is made possible while allowing for easy removal should rework of the drive be required.

In a preferred embodiment, plug 30 is formed by means of injection molding processing in which both cap 31 and capture member 33 comprise nylon.

In accordance with the present invention, one or more plugs 30 is inserted into corresponding holes 11 of the spin motor assembly. Each of plugs 30 has a very precisely controlled weight, which is varied by changing the percentage of a certain predetermined material embedded within cap 31. For example, in a current embodiment, bronze is employed to control the weight of each plug. By varying the percentage of bronze embedded within the nylon cap 31, the weight of the plugs can be precisely controlled without varying the thickness of cap 31, or the actual size of the plug itself. Practitioners in the disk drive art will appreciate the advantage of a cap 31 having a restricted z-height, or thickness which does not substantially add to the total thickness of the disk drive assembly. In modern disk drives, the total thickness of the drive assembly is a crucial dimension since most assemblies are required to fit into a predetermined form factor size.

Table 1 below illustrates eight different plugs manufactured for a current embodiment of the invention. The plugs are coded alphabetically from A through H according to differences in plug mass. As can be seen, the plug mass varies as a function of the percentage of bronze powder embedded within the nylon cap 31. The weight of the plugs varies from approximately 39 milligrams up to 210 milligrams as the percentage of bronze ranges from 0% to 82.7%. By simply varying the percent of bronze powder embedded within cap 31, plugs having a different masses or weights may be achieved without changing the physical dimensions of the plug itself. Although bronze is a currently preferred material, other metals or similar massive materials may be employed in substitution of bronze to achieve similar results.

In addition, the plugs may be coded for weight value using numerous different techniques such as printing, stamping, color coding, etc. Generally, it is most desirable to indicate the plug code by simple identification on the top of cap 31. This allows a user to quickly and easily select the correctly weighted plug to be inserted into the appropriate hole during the balancing process.

TABLE 2

| PLUG CODE | PLUG MASS (mg) | BRONZE CONTENT (%) |
| --- | --- | --- |
| A | 39 ± 3 | 0 |
| B | 65 ± 5 | 13.9 |
| C | 91 ± 5 | 42.3 |
| D | 117 ± 5 | 58.2 |
| E | 132 ± 5 | 64.5 |
| F | 158 ± 5 | 72.5 |
| G | 184 ± 5 | 78.3 |
| H | 210 ± 5 | 82.7 |

The procedure for correcting disk pack assembly imbalance involves first spinning the disk pack assembly up to its operating velocity. One or more transducer devices are then employed to sense imbalance, if any exists, in the disk pack assembly. Any one of a number of well known transducer devices may be utilized to determine the magnitude and direction of the weight distribution imbalance. Basically, the transducer device converts mechanical instability into an electrical output signal which provides a direct quantitative measure of the imbalance of the assembly.

In a current embodiment, a transducer is utilized to provide signals to a computer processor running a software program. The particular software program in use is commercially available through Haufman Balance, Company. The same software program is commonly utilized in the balancing of automobile tires. The program sequence receives the imbalance signals generated by the transducer devices as inputs. The program then converts these electrical signals into a set of imbalance vector components. The program then attempts to compensate these imbalance components utilizing the available plug weights. Finally, the program outputs a prescribed weight for one or more holes 11 to correct for the imbalance according to a prescribed algorithm.

Essentially the algorithm determines the correct plug weight and insertion location on the spin motor which best compensates the imbalance vector force detected by the transducers. The program then outputs this information to a user, who may then insert the prescribed plugs into the appropriate hole locations. Obviously, the computer program which performs the balance calculations must have, as a prerequisite to execution, certain parametric information about the disk drive and the physical relationship of its various components before it can calculate correction values. For example, information such as the location and spacing of the holes in the spin motor, the weights of each of the various types of plugs, the rotational velocity of the motor, etc., would be several of the parameters that would have to be input to the computer program prior to performing the balancing procedure.

Once the imbalance correction program has completed executing, and the user has snap-fit the appropriate plugs into their proper hole locations in the spin motor (as prescribed by the program), the balance of the disk pack assembly may be verified. If necessary, new weight adjustments may be made in the same manner described above.

Whereas many alternations and modifications of the present invention will no doubt become apparent to the person of ordinary skilled in the art after having read the foregoing description, it is to be understood that the particular embodiment shown and described by way of illustration are no way intended to be limiting. Therefore, references of details of the illustrated diagrams is not intended to limit the scope of the claims which themselves recite one of those features regarded as essential to the invention.

We claim:

1. An improved magnetic disk drive unit having a disk pack assembly including at least one magnetic disk fixedly secured to a hub of a motor by screws inserted into several of a plurality of threaded openings in an end cap of said motor, said openings each having a sidewall with threads and being disposed equidistant about a central axis of said motor, the improvement comprising:
a plurality of plug members individually adapted for selective non-rotational insertion into said openings, each of said plug members being physically the same size and having a cap, and a capture member for said non-rotational insertion into one of said openings, said capture member comprises a cylindrical shaft having and outer surface which forcibly presses against said threaded sidewall to secure said plug member in said one of said openings, said plug members providing a balancing weight for said disk pack assembly.

2. The improvement of claim 1 wherein said cap and said capture member comprise a first material with said cap being embedded with a percentage of a second material, the weight of said plug member being directly proportionally to said percentage of said second material.

3. The improvement of claim 2 wherein said second material comprises a metal.

4. The improvement of claim 3 Wherein said second material comprises bronze.

5. The improvement of claim 2 wherein said first material comprises nylon.

6. The improvement of claim 5 wherein said cap and said capture member are integrally molded.

7. The improvement of claims 1, 2, 3, 4, 5 or 6 wherein said cylindrical shaft of said capture member includes a flange which engages said threads of said sidewall during insertion into said one of said openings.

8. An improved magnetic disk drive unit having a disk pack assembly including at least one annular magnetic disk fixedly secured to a hub of a spin motor by screws inserted into a top surface of said spin motor, said screws being inserted into several of a plurality of openings each having a spiral threaded sidewall, said openings being disposed equidistant about a longitudinal axis of said spin motor, the improvement comprising:
a plurality of plugs adapted for selective, non-rotational insertion into one or more of said openings; each of said plugs comprising an integrally molded cap and cylindrical capture member of a first material, said cap being embedded with a percentage of a second material which determines the weight of said plug;
said cylindrical capture member having a flange which engages said spiral threaded sidewall to secure said plug to said top surface of said spin motor, thereby providing a balancing weight for Said disk pack assembly.

9. The improvement of claim 8 wherein said first material comprises nylon.

10. The improvement of claim 9 wherein said second material comprises a metal.

11. The improvement of claim 10 wherein said second material comprises bronze.

12. The improvement of claim 11 wherein said plurality of plugs are categorized into groups wherein each group provides a different weight based on a varying percentage of said second material.

13. The improvement of claims 8, 9, 10, 11, or 12 wherein said flange comprises a pair of raised portions separated by a central void, said raised portions forcibly engaging said spiral threaded sidewall in a manner which reduces the volume of said central void.

14. A plug for non-rotational insertion into one of a plurality of screw thread openings in an end cap of a spindle motor rotating a disk pack of magnetic disk drive unit comprising:

a cap; and a cylindrical capture member integrally molded to said cap, said cylindrical capture member and said cap comprising a first material with said cap being embedded with a percentage of a second material which determines the weight of said plug, said cylindrical capture member having a flange for engaging the screw threads of said one of a plurality of openings to secure said plug to said end cap, thereby providing balance to said rotating disk pack.

15. The plug of claim 14 wherein said first material comprises nylon.

16. The plug of claim 15 wherein said second material comprises a metal.

17. The plug of claim 16 wherein said second material comprises bronze.

18. The plug of claim 14 wherein the physical size of said cap is constant for varying percentages of said second material embedded within said cap.

19. The plug of claims 14, 15, 16, 17 or 18 wherein said flange comprises a pair of raised portions separated by a central void, said raised portions engaging the screw threads of said one of a plurality of openings such that the volume of said central void is reduced.

* * * * *